United States Patent [19]

Bauer et al.

[11] Patent Number: 4,849,682
[45] Date of Patent: Jul. 18, 1989

[54] BATTERY CHARGING SYSTEM

[75] Inventors: George W. Bauer, Shelton; Thomas J. Sokira, Cheshire, both of Conn.

[73] Assignee: Anton/Bauer, Inc., Shelton, Conn.

[21] Appl. No.: 115,155

[22] Filed: Oct. 30, 1987

[51] Int. Cl.⁴ .............................................. H02J 7/00
[52] U.S. Cl. ...................................... 320/15; 320/19; 320/21; 320/31; 320/35
[58] Field of Search ................ 320/15, 19, 21, 31, 320/35

[56] References Cited

U.S. PATENT DOCUMENTS

| | | | |
|---|---|---|---|
| 2,070,541 | 2/1937 | Beetem | 171/314 |
| 3,178,629 | 4/1956 | Saslow | 320/23 |
| 3,413,536 | 11/1968 | Webb | 320/17 |
| 3,487,284 | 12/1969 | Cady | 320/20 |
| 3,510,746 | 5/1970 | Furuishi et al. | 320/39 |
| 3,599,071 | 8/1971 | Lapuyade | 320/35 |
| 3,614,583 | 10/1971 | Burkett et al. | 320/5 |
| 3,617,851 | 11/1971 | DuPuy et al. | 320/22 |
| 3,735,233 | 5/1973 | Ringle | 320/24 |
| 3,767,995 | 10/1973 | Kaminski et al. | 320/22 |
| 3,809,993 | 5/1974 | Wheeler | 320/36 |
| 3,848,173 | 11/1974 | Hase | 320/23 |
| 3,855,516 | 12/1974 | Fairchild | 320/22 |
| 3,864,617 | 2/1975 | Smith et al. | 320/23 |
| 3,867,681 | 3/1974 | Bishop et al. | 320/21 |
| 3,911,350 | 10/1975 | Swope | 320/22 |
| 3,917,990 | 11/1975 | Sherman, Jr. | 320/35 |
| 3,938,019 | 2/1976 | Schmitt et al. | 320/21 |
| 3,944,904 | 3/1976 | Hase | 320/23 |
| 3,959,707 | 5/1976 | Stephens | 320/39 |
| 3,963,976 | 6/1976 | Clark | 320/21 |
| 3,987,353 | 10/1976 | Macharg | 320/39 |
| 4,006,397 | 2/1977 | Catotti et al. | 320/31 |
| 4,016,473 | 4/1977 | Newman | 320/14 |
| 4,016,474 | 4/1977 | Mason | 320/15 |
| 4,031,450 | 6/1977 | Hammel et al. | 320/23 |
| 4,035,709 | 7/1977 | Seider et al. | 320/23 |
| 4,061,956 | 12/1977 | Brown et al. | 320/22 |
| 4,087,733 | 5/1978 | Casagrande | 320/21 |
| 4,097,792 | 6/1978 | Calaway | 320/22 |
| 4,125,802 | 11/1978 | Godard | 320/35 |
| 4,136,310 | 1/1979 | Foster | 320/37 |
| 4,237,411 | 12/1980 | Koethe et al. | 320/21 |
| 4,270,080 | 5/1981 | Kostecki | 320/24 |
| 4,297,630 | 10/1981 | Mullersman | 320/37 X |
| 4,301,398 | 11/1981 | Johnson | 320/21 |
| 4,313,078 | 1/1982 | Bilsky et al. | 320/15 |
| 4,321,523 | 3/1982 | Hammel | 320/14 |
| 4,355,275 | 10/1982 | Anglin | 320/21 |
| 4,387,332 | 6/1983 | Yamada et al. | 320/15 |
| 4,502,000 | 2/1985 | Mashikian | 320/15 X |
| 4,554,500 | 11/1985 | Sokira | 320/31 |
| 4,670,703 | 6/1987 | Williams | 320/31 X |

OTHER PUBLICATIONS

PAG America, Limited, Apr. 1986.
SMPTE Journal, Mar. 1985; "Low-Cost, Microcomputer-Controlled Fast Charging for Ni-Cads", Hamill and Parker.
"PAG-lok"-New Camera/Battery Interface System with Accompanying Universal Charger.
"Speedcharge 4000"-PAG Power Limited, 565 Kingston Rd., London SW208SA.

Primary Examiner—R. J. Hickey
Attorney, Agent, or Firm—Kramer, Brufsky & Cifelli

[57] ABSTRACT

A system for sequentially charging a plurality of batteries initially interrogates each battery to determine the battery type and the level of charge. The charging system prioritizes the batteries to be charged from most to least fully charged and charges the batteries in that order. The charging is provided by pulsed current during sequential portions of periodic intervals to charge the batteries in a short period of time and utilize the battery charger to full or nearly full capacity.

20 Claims, 4 Drawing Sheets

FIG. 3B

BATTERY CHARGING SYSTEM

TECHNICAL FIELD

This invention relates generally to apparatus and processes for charging rechargeable batteries, and deals more particularly with apparatus and processes for charging a plurality of batteries in an order determined by a priority parameter such as the level of charge therein and for adapting the charging process to suit the battery type.

BACKGROUND OF THE INVENTION

Various charging systems for rechargeable batteries, such as nickel-cadmium (NiCd) batteries, are well known in the art. When a battery is deeply discharged, such a battery charger will typically provide a constant level of current until a battery property, such as cell voltage or temperature, reaches a cutoff level. Thereafter, several of the previously known chargers deliver constant current at a reduced magnitude, or intermittent trickle current to the battery, or a combination thereof.

Delivering constant current to a NiCd battery for an extended period of time causes excessive cell hating and gas buildup within the cell which weakens the electrolyte and greatly accelerates the decomposition of organic materials within the cells including plate separators and seals.

In commonly assigned U.S. Pat. No. 4,554,500 which issued Nov. 19, 1985, there is disclosed a battery charging method and apparatus which includes a programmable two-level constant current source. The battery is initially charged with a constant current for a predetermined time or until the battery temperature exceeds a threshold level, whichever comes first. If the temperature excess comes first, the battery charger then charges the battery at a reduced rate for an additional period of time to ensure that the battery is fully charged. Since cell temperature is a function of battery charge rate, the reduced charging rate minimizes overheating. After the predetermined or additional period of time elapses, as the case may be, the charger delivers pulsed current to prevent the battery from self-discharging.

Other presently known charging systems deliver a constant current to the battery until the battery exhibits a threshold voltage.

In order to charge a plurality of batteries, some charging systems of the prior art are configured in parallel, whereby each battery is charged independently of all others. Not every battery (or "battery pack") in a group of batteries to be charged will have the same level of discharge. Therefore, in parallel battery charging systems of the prior art, if the system has a moderate, total current output and provides an equal fraction of the total current to each battery, the time required to fully charge one battery is relatively long compared to sequential charging systems.

Other battery chargers of the prior art individually charge each battery to full charge in a sequential fashion. In sequential charging systems, no distinction is made between batteries that are only slightly discharged and those which are more fully discharged in determining the order of charging, and each battery is charged to its fully charged state with a constant current. Moreover, some battery chargers of the prior art cannot determine the type of battery to be charged, (e.g., 2 or 4 ampere-hours; 12, 13 or 14 volt), and may require that the batteries be segregated according to type in order to optimally charge them.

An object of the present invention is to provide a battery charging system that will prioritize a plurality of batteries and charge the batteries in the most time efficient manner for the group, e.g., wherein those batteries needing the least charge are charged first.

Another object of the present invention is to provide a battery charging system that automatically adjusts charging parameters in accordance with battery type.

Still another object of the present invention is to provide a battery charging system which will provide pulsed current to the batteries when appropriate to avoid overheating and gas buildup in the battery cells.

SUMMARY OF THE INVENTION

According to the present invention, a battery charging system is provided for charging a plurality of batteries. Means are provided for determining at least one parameter, such as the state of charge, of each battery and prioritizing the battery charging sequence according to the battery parameter or parameters. In one embodiment, the battery having the highest initial charge is charged first. In this manner, the system provides a fully charged battery in a short period of time.

According to another aspect of the present invention, the battery charger includes means for determining the type of battery to be charged. The battery charger may be programmed to charge certain capacity batteries first to provide fully charged batteries at this capacity in a short period of time.

According to still another aspect of the present invention, the battery charger includes charging apparatus that periodically delivers pulsed current to a substantially discharged battery, and a nearly fully charged battery or a fully charged battery during a periodic interval to maximize the charging capacity of the charger.

DETAILED DESCRIPTION OF THE PREFERRED EMBODIMENT

Figure 1:
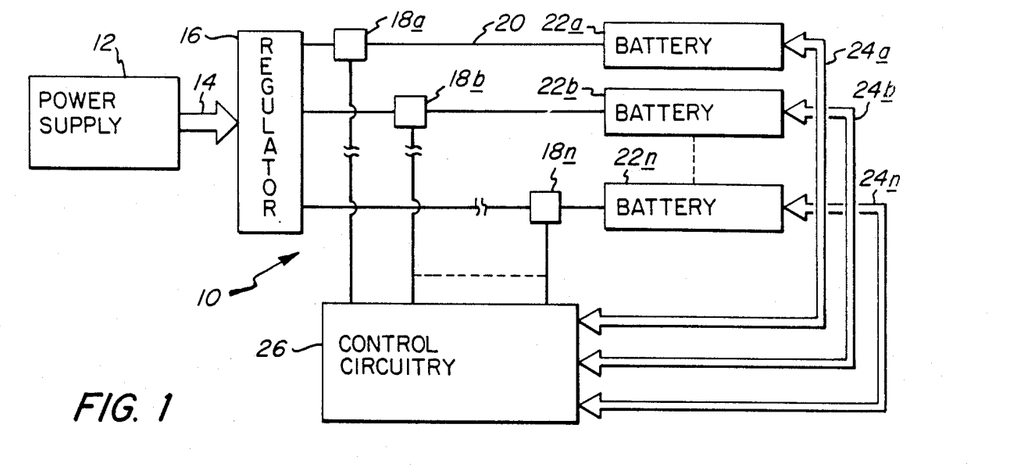
FIG. 1 is a simplified block diagram of a battery charging system according to the present invention.

Referring now to FIG. 1, there is illustrated in simplified block format a sequential battery charging system 10 in accordance with the present invention. The system 10 includes a power supply 12 which may be a switching cr a non-switching type, and provides current to a current regulator 16 via lines 14. In the illustrated embodiment, the current regulator provides a substantially constant current of 4.5 amperes at 20 volts. The output of the current regulator 16 is connected via a plurality of programmable switches 18 to a plurality of batteries 22 inserted into the system 10 for charging or maintenance of full charge. Each of the switches 18 can be selectively closed by control circuitry 26 in accordance with a computer program described below to pass current to the respective battery.

Both the constant current regulator 16 and the current switches 18 are conventional types. In the illustrated embodiment, the current regulator comprises a plurality of field effect transistors which are desirable because they can be switched numerous times without degradation. The switches 18 are also electronic.

In the illustrated embodiment, each of the batteries preferably provides signals indicative of its rated voltage and current, its state of charge, and its temperature, and transmits the signals via lines 24 to the control circuit 26. The rated voltage and current may be indicated by a resistor within the battery, and the state of charge may be indicated by the temperature or voltage of the battery or by electronic circuitry within the battery which monitors the discharge of the battery. The battery temperature may be indicated by one or more thermostats within each battery adjacent to the battery cells.

Figure 2:
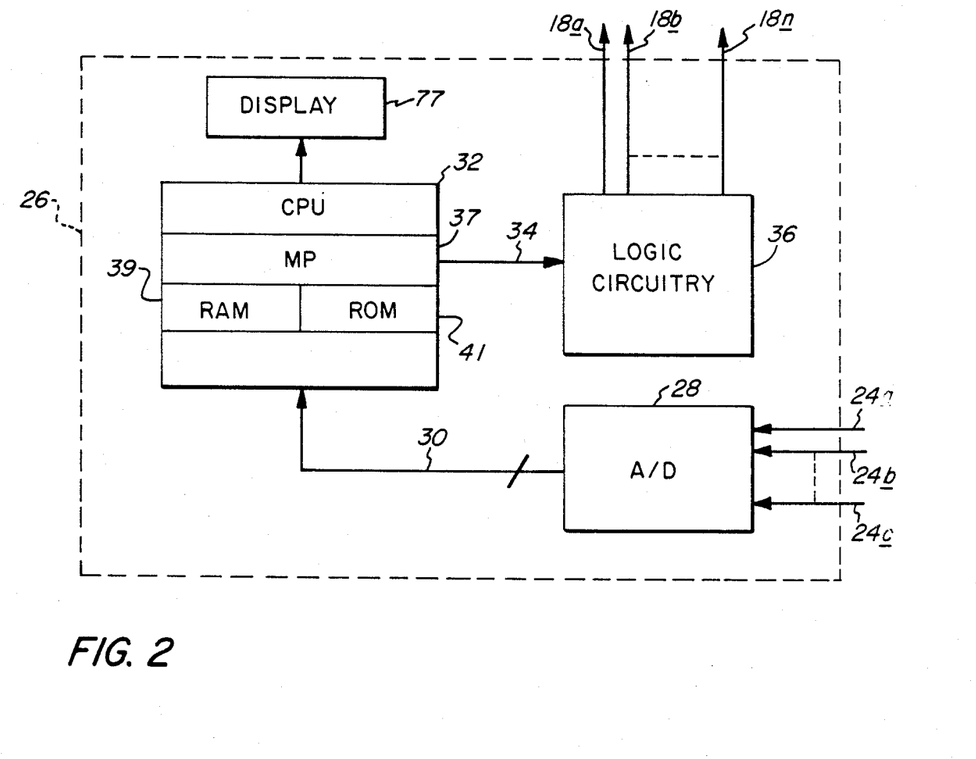
FIG. 2 is a more detailed block diagram of a control circuit within the system of FIG. 1.

FIG. 2 is a simplified block diagram of the control circuit 26 of FIG. 1. The control circuit 26 relies on the aforesaid feedback signals from each battery 22 via the lines 24 for proper operation. These signals are received by a conventional A/D converter 28 which transmits an equivalent digital signal on lines 30 to central processing unit (CPU) 32. The CPU is a conventional type well known in the art. The CPU includes a conventional processor 37, random access memory 39 and read only memory 41. In response to the received signals and firmware resident within the ROM 41, the central processor transmits control signals on lines 34 to logic circuitry 36 which selectively closes the switches 18, one at a time, according to the computer program described below.

As detailed hereinafter with respect to FIG. 3, the electronic control circuitry of FIG. 2 is configured to prioritize each of the batteries according to a battery parameter and provide selective, sequential charging thereto. Also, the electronic control circuit causes the periodic delivery of pulsed current (of 4.5 ampere magnitude in the preferred embodiment) to the batteries. In the preferred embodiment of the invention, the pulse width is approximately 900 milliseconds for substantially discharged batteries, and approximately 100 milliseconds for nearly charged or fully charged batteries when such states are determined. The pulse width is approximately 100 milliseconds in the latter cases and the average current less than one-tenth the rated current because of the deleterious effects on the individual NiCd battery cells when this pulse duration and average current are exceeded for a prolonged period. It has been found by battery manufacturers and others that adverse chemical reactions within the individual battery cells can be substantially eliminated if current is provided to the battery for periods of less than approximately 100 milliseconds in these cases.

It has also been found by Applicants that the periodic delivery of higher than rated current to the substantially discharged battery for 900 milliseconds per period does not harm the battery as long as the average current during the period is approximately rated current for recommended fast charge, or less.

For charging a plurality of batteries in the shortest possible time, the present charging system 10 avoids the need for an extremely large and power-consuming power supply by charging the individual batteries in a sequential rather than a parallel fashion. In the preferred embodiment of the present invention, the pulsed current magnitude is greater than the rated current of the batteries. An effective or average charging rate is established by varying the duty cycle of the pulsed current delivered to each battery.

As detailed in Applicant's commonly owned U.S. Pat. No. 4,554,500 entitled "Battery Charging Apparatus and Method" issued Nov. 19, 1985 and incorporated herein by reference, once a battery has been determined to be almost fully charged, an equalizer current may be provided to equalize the charge between battery cells and thereby fully charge the battery. This charging rate may be 1/10 the charging rate (C/10) used for deeply discharged batteries. Moreover, upon completion of the equalizer charging cycle, the fully charged battery may receive periodic charging to prevent self-discharge. The charge rate to prevent self-discharge may be approximately 1/50 the charging rate (C/50) used for deeply discharged batteries.

Figure 3A:
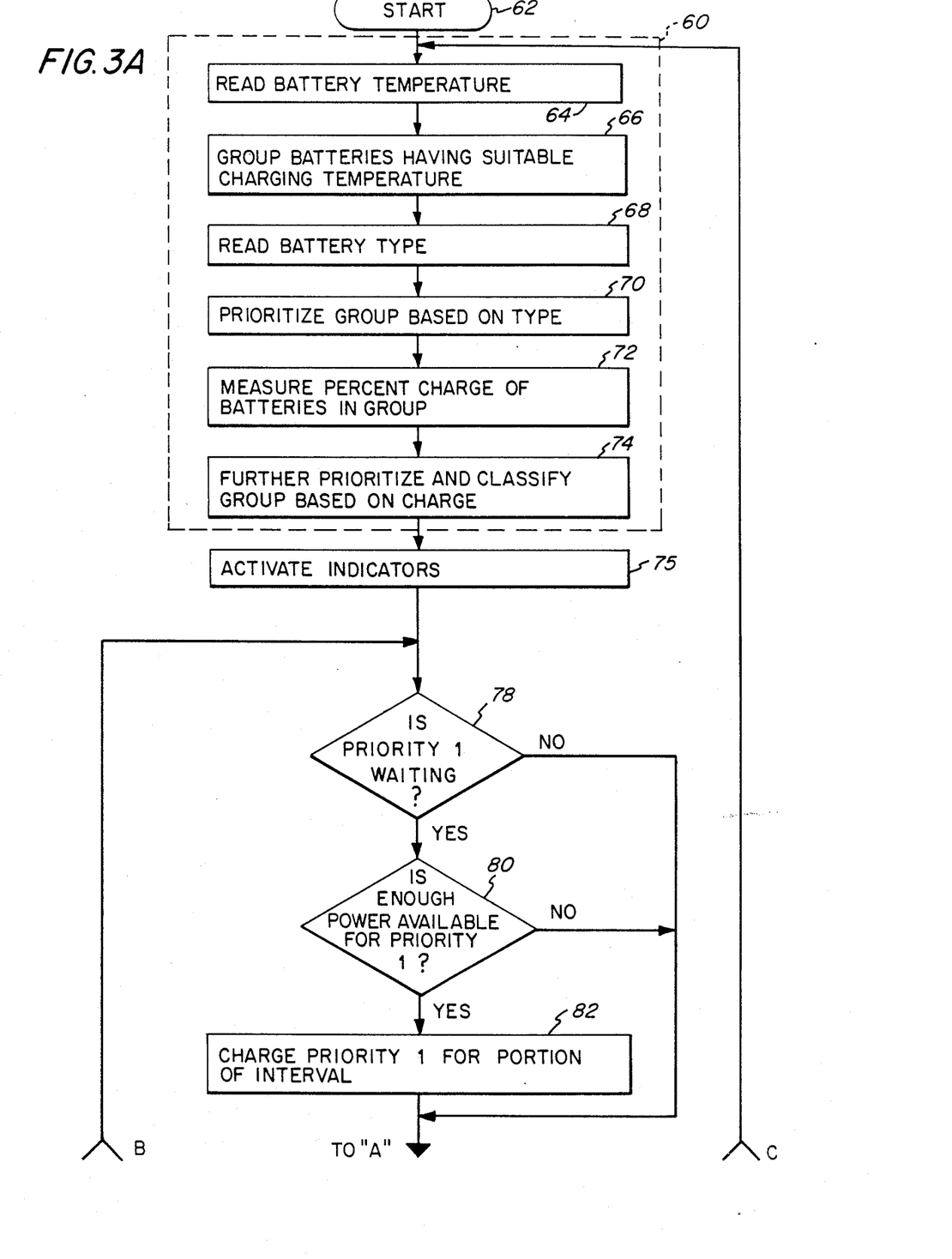
FIG. 3(a) is the top portion and FIG. 3(b) is the bottom portion of a simplified flow chart of a computer program executed by the battery charging system of FIG. 1.
Figure 3B:
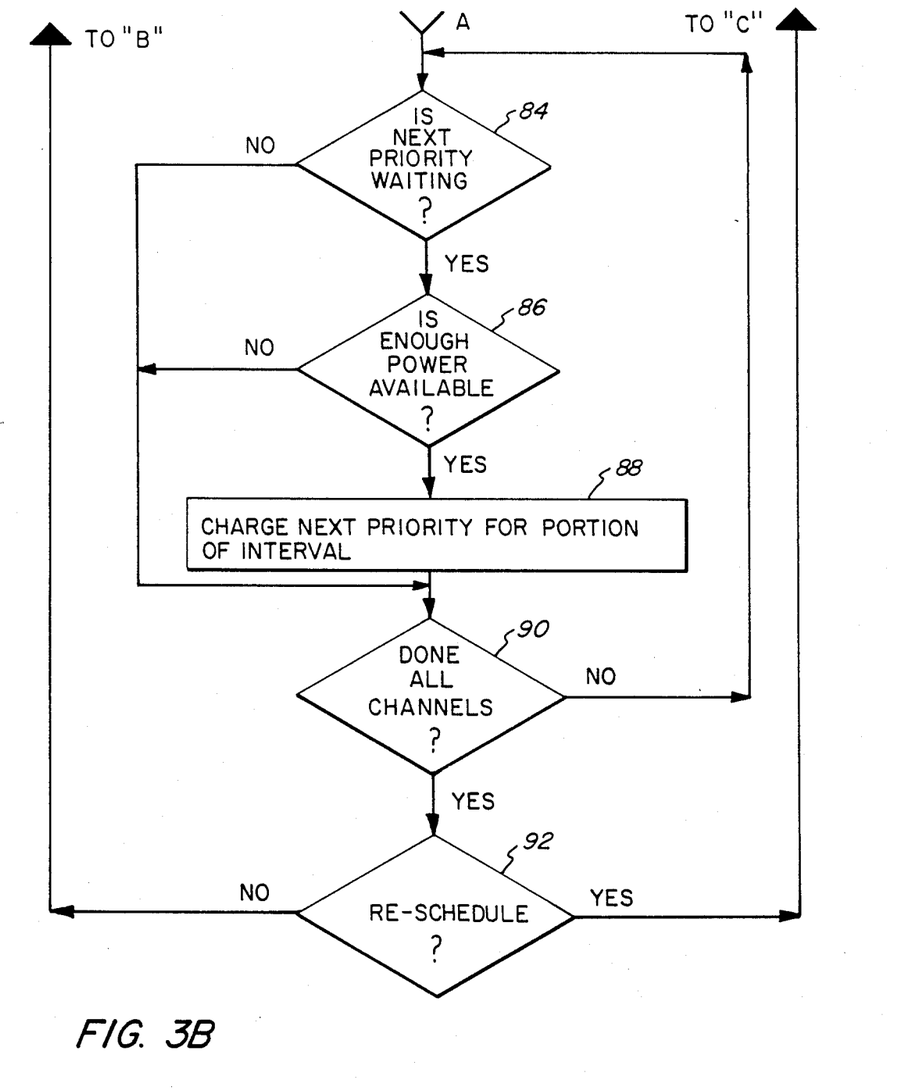

The flow chart of FIG. 3 further illustrates the process for prioritizing the batteries and charging them. The CPU 32 directs the process according to firmware contained within the ROM 41. A prioritizing portion 60 of the flow chart begins when the system 10 is turned-on (Step 62), whenever a battery is installed into or removed from the charging system 10, and whenever a battery within the system 10 is charged to a state in which it no longer requires the present charging current (step 92 described in more detail below).

According to the prioritizing subroutine 60, first the CPU 32 reads the thermostats within the batteries 22 to determine which of the batteries exhibit a temperature within a range suitable for charging. If a battery is above the range, for example above 45° C., this may indicate that the battery has been recently charged or otherwise heated. Consequently, further charging may damage the battery and therefore is prevented by this test (step 64). The batteries exhibiting the suitable charging temperatures are grouped together and their locations are stored in the RAM 39 (step 66).

Next, according to the prioritizing subroutine 60, the CPU reads the type of batteries within the system 10 (step 68) and, as noted above, this may be accomplished by sensing the values of resistors contained within the batteries 22 or by other electronic circuitry or indicators within the batteries. Then, the microprocessor prioritizes the aforesaid group contained in the RAM based on the type of each battery within the group and a predetermined priority order programmed into the CPU 32 (step 70). For example, the system 10 may be able to accommodate both four ampere-hour and two ampere-hour batteries, and the CPU 32 may be programmed to cause the four ampere-hour batteries to be charged before the two ampere-hour batteries because statistically a four ampere battery can be charged as quickly as a two ampere battery by the system 10, and will provide greater capacity for the user.

Next, according to the prioritizing subroutine 60, the CPU 32 measures the degree of charge of each of the batteries within the aforesaid group (step 72). As noted above, this may be accomplished either by measuring the voltage of the battery or by reading the electronic circuitry within the battery which circuitry directly monitors the state of charge of the battery based on its previous usage. Then, the CPU 32 further prioritizes the group stored in the RAM 39 based on its charge such that the battery with the highest charge below the level requiring only the equalizer current is assigned priority one, and the batteries containing lesser levels of charge are assigned priority two, three, etc. (step 74). The batteries having a state of charge below that requiring only equalizer current are referred to herein as batteries needing "substantial" charge. The batteries, if any, requiring only the equalizer current are given the next highest priorities, and the batteries, if any, which are fully charged and require only the trickle current are given the next highest priorities. However, because it is difficult to initially determine the state of charge of each battery with accuracy based on its voltage, CPU initially assumes that each battery is "substantially discharged". Then, the CPU 32 activates LEDS or other indicators 77 associated with the batteries to indicate which of the batteries are fully charged (step 75) but at this time in the aforesaid example none of the batteries are deemed fully charged.

Next, the CPU 32 executes a charging portion of the flow chart. The CPU determines whether the priority one battery 22 is "waiting", meaning whether the priority one battery has a temperature, type, and state of charge which is suitable for charging (step 78), and whether the battery needs charge during a next periodic interval 40d (illustrated in FIG. 4 to be one second in duration) to provide a predetermined charging rate. In the illustrated example, the highest priority battery is suitable for charging and is assumed to be substantially discharged. Therefore, the CPU assumes that it needs "fast charge", an average charging current of approximately 4.0 amps provided by a pulse of 4.5 amps for 900 milliseconds of the next and each periodic interval 40. Accordingly, the algorithm proceeds to step 80 where CPU 32 determines that there is sufficient power available from the regulated power supply 12 during the next periodic interval 40d to supply the power required by the priority one battery, so the CPU 32 activates logic circuitry 36 to close the switch 18 associated with the priority one battery for a subinterval 39 which is 900 milliseconds during the interval 40d (step 82) to deliver a pulse 41 of current. This provides an average current of 4.05 amperes during the interval 40d since the power supply 12 outputs a steady state current of 4.5 amps.

Then, the CPU 32 recalls from its RAM 39 the channel of the priority two battery 22 and determines that the priority two battery is "waiting" (step 84) according to the same criteria described above. The CPU 32 then determines whether the regulated power supply 32 has enough power available during the remainder of the interval 40d illustrated in FIG. 4 to supply the requirements of the priority two battery which is also presumed to be substantially discharged (step 86). In the illustrated example, there is not sufficient time remaining during the interval 40d to supply an average current of approximately 4.0 amperes to the priority two battery, so the CPU 32 skips to step 90 in which it determines that other batteries should be considered. Then the CPU loops through the steps 84 and 86 and determines that the third, fourth, and fifth priority batteries are waiting, but there is not sufficient time remaining during the interval 40d to charge them. After this determination is made for the fifth priority battery, the CPU proceeds from the step 90 to step 92 in which it determines whether rescheduling is required, that is, whether any conditions have changed requiring the CPU to execute the prioritization subroutine 60 again (step 92). As noted above, these new conditions may result from either a new battery being installed in the system 10, a battery being removed from the system 10, or the priority one battery completing its charging cycle.

The CPU 32 monitors three parameters to determine when the priority one battery is nearly charged and therefore terminate the rated charging cycle of the priority one battery 22. First, the CPU continuously sums the time that the current is delivered to the priority one battery, and when the total time reaches 150% of the rated capacity, terminates the charging cycle and proceeds from the step 92 to the prioritization subroutine 60 to reorder the batteries. Second, the CPU 32 continuously monitors the battery temperature, and if the battery temperature exceeds a predetermined limit associated with safe charging of the battery, then the CPU 32 proceeds from the step 92 to the prioritization subroutine 60. Third, the CPU continuously monitors the voltage of the priority one battery to determine when the voltage profile corresponds to that of a fully charged battery of the same cell type. If the first priority battery was nearly fully charged or fully charged, then the second or third parameter would probably trigger the end of the fast charge cycle.

After a number of iterations of the steps 78-90, depending on the initial state of charge of the priority one battery, the priority one battery completes its charge cycle as noted above, and the original priority two battery becomes the new priority one battery and is charged with 900 millisecond pulses during steps 82 so that the batteries are charged in order of highest charge in accordance with the invention.

If the original priority one battery received 150% of rated amp-hours before the completion of its fast charge cycle, then it is deemed fully charged, otherwise it is deemed nearly fully charged by the CPU to determine subsequent priority and charging.

For a further description of the invention, assume that at a later date after considerably more operation of the system 10, there are five batteries installed in the system. All are four ampere-hour batteries and are within the required temperature range. The CPU presumes that two of the batteries 22a and 22b are substantially discharged and need the maximum charging rate, and, by previous charging, that one of the batteries 22c is nearly fully charged and needs only the equalizer current, and the other two batteries 22d and 22e are fully charged and need only the trickle current. Also, the battery 22a has a greater state of charge than the battery 22b. Consequently, batteries 22a-e are assigned priorities one-five, respectively.

Next, the CPU 32 executes the charging portion of the flow chart. The CPU determines whether the priority one battery 22a is "waiting", meaning whether the priority one battery has a temperature, type, and state of charge which is suitable for charging (step 78), and whether the battery needs charge during a next periodic interval 40a (illustrated in FIG. 5 to be one second) to provide a predetermined charging rate. In the illustrated example, the highest priority battery is suitable for charging, and needs an average charging current of approximately 4.0 amps provided by a pulse of 4.5 amps for 900 milliseconds of the next and each periodic interval 40. Accordingly, the algorithm proceeds to step 80 where CPU 32 determines that there is sufficient power available, i.e., remaining, unused charging time, from the regulated power supply 12 during the next periodic interval 40a to supply the power required by the priority one battery. Consequently, the CPU 32 activates logic circuitry 36 to close the switch 18 associated with the priority one battery for a subinterval 39 which is 900 milliseconds during the interval 40a (step 82) to deliver a pulse 41 of current. This provides an average current of 4.05 amperes during the interval 40a since the power supply 12 outputs a steady state current of 4.5 amps.

Then, the CPU 32 recalls from its RAM 39 the channel of the priority two battery 22b and determines whether the priority two battery is "waiting" (step 84) according to the same criteria described above. This is true in the illustrated example, so the CPU 32 then determines whether the regulated power supply 32 has enough power available during the remainder of the interval 40a illustrated in FIG. 5 to supply the requirements of the priority two battery (step 86). In the illustrated example, there is not sufficient time remaining during the interval 40a to supply an average current of approximately 4.0 amperes to the priority two battery, so the CPU 32 skips to step 90 in which it determines that other batteries should be considered. Then the CPU loops back to the step 84 to determine if the priority three battery 22c is waiting, and then to the step 86 again. In the example illustrated in FIG. 5 where the priority three battery is nearly fully charged, and needs only the equalizer current, the CPU 32 determines that the priority three battery needs an average current of approximately 0.15 amps provided by a pulse of 4.5 amps for 100 milliseconds every three seconds. Consequently, the CPU causes the logic circuitry 81 to close the switch 18 associated with the priority three battery for 100 milliseconds during a subinterval 44a of the interval 40a (step 88) and notes in its memory that the priority three battery needs the 100 millisecond pulse every third interval thereafter to provide an average current of 0.15 amperes. Curve 46a illustrates the pulse of current delivered to the priority three battery during the interval 40a.

Figures 4, 5:
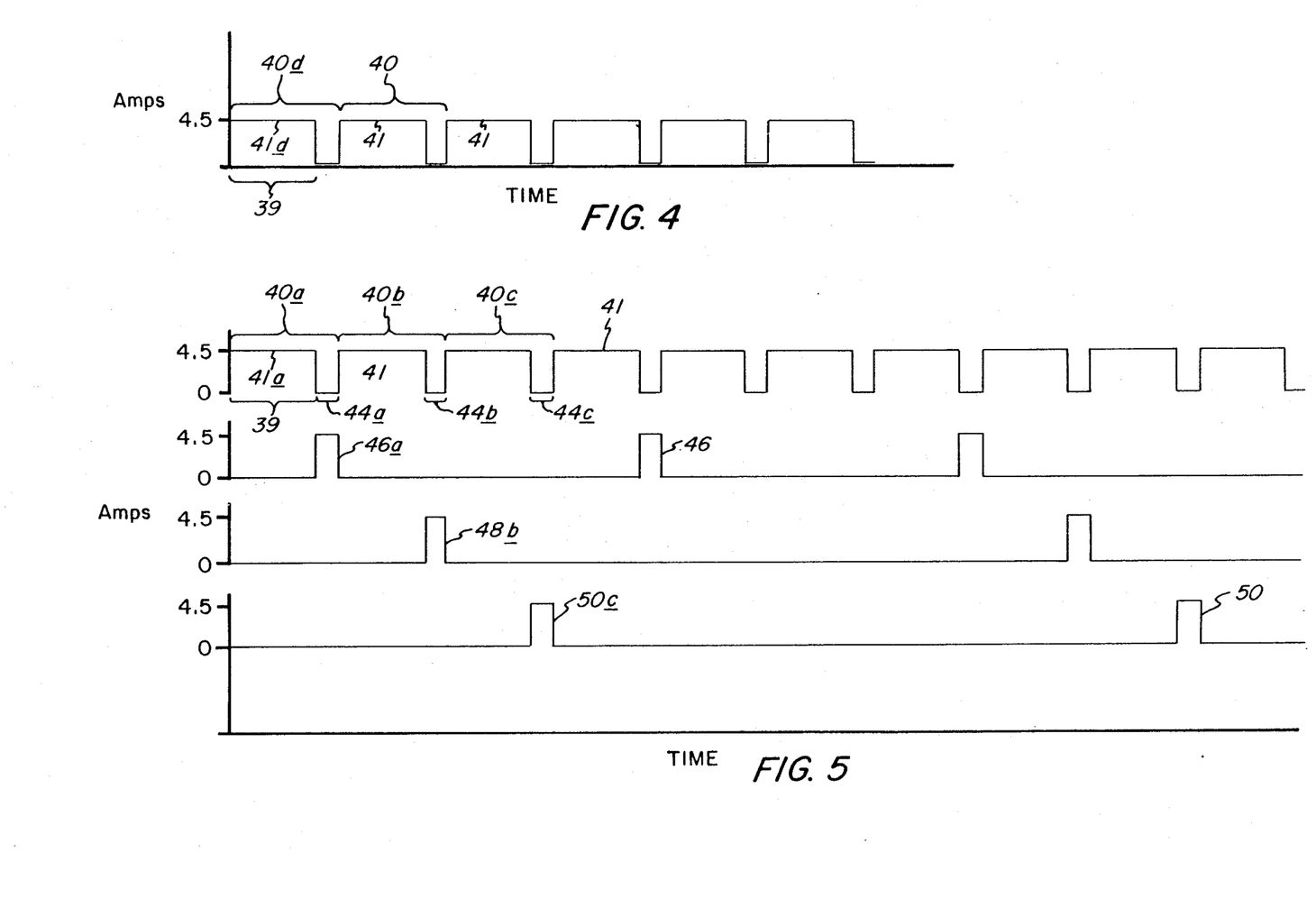
FIG. 4 is a timing diagram illustrating current delivered by the charging system of FIG. 1 to one battery.
FIG. 5 is a timing diagram illustrating current delivered by the charging system of FIG. 1 to four batteries.

Then, the CPU 32 determines whether all of the batteries within the system 10 have been considered for charging (step 90). This is not the case in the illustrated example, so the CPU 32 returns to step 84 to consider whether the next priority battery, in this case the priority four battery 22d, is waiting, and if so, whether the regulated power supply 12 has enough power available during the remainder of the interval 40a to supply the requirements of the priority four battery. In the illustrated example, the priority four battery is fully charged and needs only the trickle current to retain the full charge. The trickle charge corresponds to a 100 millisecond pulse of current (4.5 amps in magnitude) every six seconds to yield an average current of 75 milliamps. However, there is no time remaining during the interval 40a, so the CPU loops from the step 86 to the step 84 via the step 90 and repeats the same analysis for the priority five battery. Because there is no time remaining during the interval 40a, the execution of the steps 84 and 86 associated with the fifth priority battery leads to step 92 via step 90 because the fifth priority battery is the last battery in the system 10.

It should be noted that if the priority one battery 22a was rated at only two ampere-hours, then in the step 82, the system 10 would supply 4.5 amperes to the priority one battery for only 450 milliseconds, and 450 milliseconds would be used during step 88 to charge the priority two battery if it was also a two ampere-hour battery.

Referring again to the example illustrated in FIG. 5, after the CPU 32 completes its four iterations of the steps 84, 86, 88 and 90, the CPU determines whether any conditions have changed requiring the CPU to execute the prioritization subroutine 60 again (step 92). As noted above, these new conditions may result from either a new battery being installed in the system 10, a battery being removed from the system 10, the priority one battery completing its charging cycle, or the priority three battery reaching its fully charged state.

Also, as noted above, the CPU 32 monitors three parameters to determine when the priority one battery is nearly charged and therefore terminate the rated charging cycle of the priority one battery 22a.

Also, the CPU 32 continuously monitors the charging cycle of the priority three battery to determine when the cells in the priority three battery have been equalized. To approximately determine when the equalization has been accomplished, the CPU 32 sums the total ampere hours of charging current delivered to the priority three battery by the system 10, and when the total exceeds the rated capacity of the battery by approximately 50%, the CPU 32 considers that the battery cells have been equalized.

Assuming that neither the priority one nor priority three battery has completed its charging cycle after one iteration of the steps 78-82 and four iterations of the steps 84-92, the CPU 32 proceeds from the step 92 to the steps 78-82 to charge the priority one battery with a 900 millisecond pulse during the next interval 40b. Then, the CPU 32 proceeds through the steps 84, 86 and 90 in which it determines that the priority two battery is waiting, but there is insufficient power to charge it during the next interval 40b.

Then the CPU executes the step 84 again and determines that the priority three battery is not waiting because it received a 100 millisecond pulse of current during the previous interval 40a and will not need another pulse for two more intervals 40. Then the CPU skips back to the step 84 and determines that the priority four battery is waiting because it needs the trickle current, and did not receive a 100 millisecond pulse of current during the previous interval 40a or during five previous intervals. Next, the CPU proceeds to the step 86 and determines that the next subinterval 44b is available to charge the fourth priority battery, and does so in the step 88 for 100 milliseconds as illustrated by curve 48b in FIG. 4.

Then the CPU repeats the step 84 for the fifth priority battery and notes that it is also waiting because it needs the trickle charge and did not receive a 100 millisecond pulse during the previous interval 40a or five previous intervals. However, the subinterval 44b is not available so the CPU skips from the step 86 to the steps 78-82 to deliver another 900 millisecond pulse 41 to the first priority battery assuming that rescheduling was not required in step 92.

In the next series of iterations of steps 84-88, the CPU notes that the priority two battery is waiting but not serviceable because of lack of power, the priority two and three batteries are not waiting because they received pulses of current during the previous two intervals, and the priority five battery is waiting and there is time available during subinterval 44c. Then, the CPU delivers in step 88 a 100 millisecond pulse (curve 50c) during interval 40c to the fifth priority battery.

The foregoing process is repeated until rescheduling is required in step 92. Then, if the priority one battery is nearly fully charged, in the illustrated example, the priority two battery becomes the new priority one battery pursuant to the prioritization subroutine 60 and is charged during the steps 82 (pulses 41) so that the batteries in need of substantial charge are charged in order of the highest charge.

Note that in accordance with the present invention, the benefits of current pulses of less than 100 millisecond duration to fully charged and nearly charged batteries are obtained after determining these states, while a plurality of batteries are charged in a time-efficient manner. The portion of the charging interval not used to charge the priority one battery is often redirected to the other batteries. This ensures that all the batteries will be charged as quickly as possible without wasting time or charger capacity. Also, the least discharged battery of a given type is charged first so that the system 10 provides to the user at least one fully charged battery in a short time.

By the foregoing, a battery charging system embodying the present invention has been disclosed. However, numerous modifications and substitutions may be made without deviating from the scope of the invention. For example, if one of the prioritizing parameters specified in the subroutine 60 cannot be sensed from the batteries, then the prioritization can be based on the other parameters. Also, the system 10 may charge batteries above the optional temperature range. In this case, the warm batteries may be assigned a lower priority than those batteries within the optional range. Therefore, the invention has been disclosed by way of illustration and not limitation, and reference should be made to the following claims to determine the scope of the invention.

We claim:

1. An apparatus for charging a plurality of batteries, said apparatus comprising:
    means for reading at least one parameter associated with each of said batteries;
    means, coupled to the reading means, for determining which of said batteries has the highest charging priority based on said battery parameter or parameters; and
    means responsive to the determining means for charging said highest priority battery before other batteries in said plurality.

2. An apparatus as set forth in claim 1 wherein one of said battery parameters is the state of charge of each of said batteries.

3. An apparatus as set forth in claim 2 wherein the battery having the highest state of charge is assigned highest priority and charged first by the charging means.

4. An apparatus as set forth in claim 2 wherein:
    the determining means includes means for determining which of said batteries in need of substantial charge have the highest state of charge and the next highest state of charge; and
    the charging means includes means for automatically charging said battery having the highest charge before charging said battery having the next highest charge.

5. An apparatus as set forth in claim 2 wherein another one of said battery parameters is temperature.

6. An apparatus as set forth in claim 5 wherein the battery having the highest state of charge is assigned highest priority among a plurality of batteries needing substantial charge and exhibiting a temperature within a range suitable for charging.

7. An apparatus as set forth in claim 1 wherein one of said battery parameters is battery capacity.

8. An apparatus as set forth in claim 7 wherein batteries having one predetermined capacity are charged before batteries having another capacity.

9. An apparatus as set forth in claim 1 wherein said charging means includes means for delivering higher than rated, fast charge current to said highest priority battery during one subinterval of each of a multiplicity of periodic intervals, said current and said subinterval being such that the average current delivered during said periodic interval is approximately the rated, fast charge current of said highest priority battery, and delivering an equalizer current to another battery of said plurality which is nearly fully charged, during other subintervals of at least some of said periodic intervals.

10. An apparatus as set forth in claim 9 wherein said charging means includes means for delivering a current to a fully charged battery of said plurality during still other subintervals of at least some of said periodic intervals to trickle charge and thereby prevent discharge of said fully charged battery.

11. An apparatus as set forth in claim 10 wherein said equalizer current has a constant magnitude during the associated subintervals approximately equal to said higher than rated, fast charge current, and said trickle charging current has a constant magnitude during the associated subintervals approximately equal to said higher than rated, fast charge current.

12. An apparatus for charging a plurality of batteries having less than full charge, said apparatus comprising:
    means for determining the approximate state of charge of each of said batteries to be charged;
    means coupled to the determining means for assigning each of said batteries a priority based at least in part on the state of charge determined by said determining means with a highest priority corresponding to the battery having the most charge through a lowest priority corresponding to the battery having the least charge; and
    means for charging each of said batteries in accordance with the assigned priorities.

13. An apparatus as set forth in claim 12 wherein the charging means further comprises means for delivering, during one subinterval of a periodic interval, current to the highest priority battery, and delivering during other subintervals of at least some of said periodic intervals, current to at least one other of the batteries in said plurality.

14. An apparatus as set forth in claim 12 further comprising:
    means for sensing the temperature of each of said batteries of said plurality; and
    means for modifying the battery priorities based on the temperature of the batteries such that batteries having temperatures within a temperature range suitable for charging have a higher priority than batteries having temperatures outside of said temperature range.

15. An apparatus as set forth in claim 14 further comprising:
    means for determining the capacity of each of the batteries in said plurality; and
    means for modifying the battery priorities based on the battery capacity such that batteries of a certain capacity have a higher priority than batteries of another capacity regardless of the state of charge of the batteries.

16. An apparatus for charging a plurality of batteries including a substantially discharged battery and a nearly fully charged battery, said apparatus comprising:

means for determining the states of charge of said substantially discharged battery and said nearly fully charged battery; and charging means for delivery to said substantially discharged battery, during one subinterval of each of a multiplicity of periodic intervals, a pulse of higher than rated current yielding approximately rated charging current on the average to said substantially discharged battery, and delivering to said nearly fully charged battery during another subinterval of each of said multiplicity of said periodic intervals, a pulse of higher than rated current yielding an equalization current on the average to said nearly fully charged battery to equalize the charge of cells in said nearly fully charged battery, said pulse of current in said one subinterval being substantially greater in duration than said pulse of current in said other subinterval, and said one subinterval not overlapping said other subinterval to minimize the peak current requirement of said charging means.

17. An apparatus as set forth in claim 16 wherein:

said plurality of batteries includes a fully charged battery;

the determining means includes means for determining the state of charge of said fully charged battery; and said charging means includes means for delivering, during said periodic intervals, a trickle current on the average to said fully battery to prevent said fully charged battery from discharging over time.

18. An apparatus for charging a plurality of batteries including a substantially discharged battery and a nearly fully charged battery and for maintaining the charge of a fully charged battery, said apparatus comprising:

means for determining the states of charge of said substantially discharged battery, said nearly fully charged battery and said fully charged battery; and charging means for delivering, during periodic intervals, approximately rated charging current on the average to said substantially discharged battery, delivering, during said periodic intervals, an equalization current on the average to said nearly fully charged battery to equalize the charge of cells in said nearly fully charged battery, and delivering, during said periodic intervals, a trickle current on the average to said fully charged battery to prevent said fully charged battery from discharging over time, and wherein said charging means includes means for delivering pulses of higher than rated charging current to said substantially discharged battery, said nearly fully charged battery and said fully charged battery during respective subintervals of said periodic interval.

19. An apparatus as set forth in claim 18 wherein said charging means includes means for delivering approximately 4.5 amperes of current during each of said respective subintervals, said rated current of at lest one of said batteries is 4 amperes, and the duration of the current delivered to said nearly fully charged battery and said fully charged battery is less than or equal to approximately 100 milliseconds.

20. An apparatus for charging a plurality of batteries including a substantially discharged battery and a nearly fully charged battery, said apparatus comprising:

means for determining the states of charge of said substantially discharged battery and said nearly fully charged battery; and charging means for delivering, during periodic intervals, approximately rated charging current on the average to said substantially discharged battery, and delivering, during said periodic intervals, and equalization current on the average to said nearly fully charged battery to equalize the charge of cells in said nearly fully charged battery; and wherein said charging means includes means for delivering a pulse of approximately constant, higher than rated charging current to said substantially discharged battery during one subinterval of every periodic interval, and a pulse of approximately constant current to said nearly fully charged battery during another subinterval of every "N" periodic intervals where "N" is an integer greater than one.

* * * * *